(12) United States Patent
Dennis et al.

(10) Patent No.: US 8,272,484 B1
(45) Date of Patent: Sep. 25, 2012

(54) CALIPER BRAKE

(75) Inventors: Brian P. Dennis, Kalamazoo, MI (US); Kenneth A. Dodd, Dowagiac, MI (US); Norman D. Crawford, Saint Joseph, MI (US); Peter J. Pozivilko, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 478 days.

(21) Appl. No.: 12/387,333

(22) Filed: Apr. 30, 2009

Related U.S. Application Data

(60) Provisional application No. 61/126,377, filed on May 2, 2008.

(51) Int. Cl.
*F16D 55/228* (2006.01)
*B60T 11/10* (2006.01)

(52) U.S. Cl. .............. 188/72.5; 188/73.47; 188/352

(58) Field of Classification Search ............. 188/71.1, 188/72.1, 72.4, 72.5, 73.46, 73.47, 352
See application file for complete search history.

(56) References Cited

U.S. PATENT DOCUMENTS

| | | | | |
|---|---|---|---|---|
| 3,545,577 A | * | 12/1970 | Harrison | 188/352 |
| 3,654,689 A | * | 4/1972 | Schwarz | 188/72.5 |
| 7,597,178 B2 | * | 10/2009 | Dennis et al. | 188/72.4 |
| 2004/0251093 A1 | * | 12/2004 | Simmons et al. | 188/72.4 |

OTHER PUBLICATIONS

Drawing No. 31271 (1 sheet) Ausco Products, Inc. Benton Harbor Michigan.
Drawing No. 81430 (1 sheet) Ausco Products, Inc. Benton Harbor Michigan.
Drawing No. 31766 (2 sheets) Ausco Products, Inc. Benton Harbor Michigan.
520 Series Caliper Disc Brake, Mico, Incorporated, North Mankato, Minnesota (1 page).
M4 Series Service Brakes, Carlisle Industrial Brake & Friction, Bloomington, Indiana (2 pages).
H6 Series Service Brakes, Carlisle Industrial Brake & Friction, Bloomington, Indiana (2 pages).

* cited by examiner

*Primary Examiner* — Thomas J Williams
(74) *Attorney, Agent, or Firm* — Renner, Kenner, Greive, Bobak, Taylor & Weber

(57) ABSTRACT

A hydraulic caliper brake including a housing having a first half and a second half and a bridge connecting the housing halves. Each half of the housing includes a bore having a fluid chamber and a piston therein. The caliper brake also includes a fluid network having an inlet port and a bleed port in the first half of the housing, a first channel extending through the bridge and in fluid communication with the inlet port and the fluid chamber in the second half of the housing, and a second channel extending through the bridge and in fluid communication with the fluid chamber in the second half of the housing and the bleed port. A dual-flow passage is provided and is in fluid communication with the fluid chamber in the first half of the housing and the second channel. The fluid chamber in the first half is not in fluid communication with the first channel.

11 Claims, 6 Drawing Sheets

CALIPER BRAKE

CROSS-REFERENCE TO RELATED APPLICATION

This application claims priority of provisional U.S. Application No. 61/126,377 filed May 2, 2008, which is incorporated herein by reference.

TECHNICAL FIELD

This invention relates to a caliper brake. More specifically, this invention relates to a piston actuated caliper brake with an improved fluid flow network and bleed system.

BACKGROUND ART

Caliper style brakes include one or more stators having friction plates adhered thereto. These stators selectively engage a rotor positioned adjacent to the stator, or between opposing stators, to cause a braking force to be applied. In many cases the stators are caused to move by one or more pistons that are actuated upon introduction of a pressurized fluid, such as oil.

Prior art piston operated braking systems suffer from several drawbacks due to inadequate or inefficient fluid transmission arrangements within the brake housing. Typically, in the case of dual-piston caliper brakes, multiple input and output ports are required to supply pressurized brake fluid to the piston cavities and to allow for the bleeding of air from both piston cavities. The input and output ports have conventionally been positioned on opposite sides of the caliper brake to provide positive bleeding to both piston cavities. If the input and output ports of a conventional bleed system were placed on a common side of the brake, the piston on the opposite side of the brake would not be adequately bled and air would remain in the piston cavity. As a result, it has been necessary in conventional caliper brakes that the ports are placed on opposite sides of the brake. However, having ports on both sides of the caliper brake makes mounting the brake on a vehicle difficult because access to both sides of the brake's housing is necessary to perform the bleeding. In addition, conventional bleed systems require extensive machining, which increases the time and cost involved in manufacturing the brakes.

In view of these problems, it is evident that the need exists for a caliper brake with an improved bleed system that may provide positive bleeding to both piston cavities while making mounting the brake easier.

DISCLOSURE OF THE INVENTION

It is thus an object of one aspect of the present invention to provide a caliper brake with an improved bleed system.

It is an object of another aspect of the present invention to provide a caliper brake, as above, having all input and output ports on a single side of the brake.

It is an object of a further aspect of the present invention to provide a dual-piston caliper brake that provides positive bleeding to both piston cavities.

These and other objects of the present invention, as well as the advantages thereof over existing prior art forms, which will become apparent from the description to follow, are accomplished by the improvements hereinafter described and claimed.

In general, a hydraulic caliper brake according to the concepts of the present invention comprises a housing having a first half and a second half, a bridge connecting the housing halves, and a bore through each of the housing halves. Each bore has a fluid chamber and a piston therein. The brake also includes a fluid network including an inlet port and a bleed port in the first half of said housing, a first channel extending through the bridge and in fluid communication with the inlet port and the fluid chamber in the second half of the housing, and a second channel extending through said bridge and in fluid communication with the fluid chamber in the second half of the housing and the bleed port. A dual-flow passage is provided and in fluid communication with the fluid chamber in the first half of the housing and the second channel. The fluid chamber in the first half is not in fluid communication with the first channel.

In accordance with at least one aspect of the present invention a hydraulic caliper brake is provided including a housing having a first half and a second half, a bridge connecting the housing halves, and a bore through each of the housing halves. Each of the bores has a fluid chamber and a piston therein. The hydraulic caliper brake also includes a fluid network having an inlet port, a first bleed port, and a second bleed port, each port being located in the first half of the housing. The first bleed port is in fluid communication with the first fluid chamber. The fluid network also includes a first channel extending through the bridge and in fluid communication with the inlet port and the fluid chambers in the first and second halves of the housing, and a second channel extending through the bridge and in fluid communication with the fluid chamber in the second half of the housing and the second bleed port. The first bleed port is used to bleed the first fluid chamber and the second bleed port is used to bleed the second fluid chamber.

A preferred exemplary caliper brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
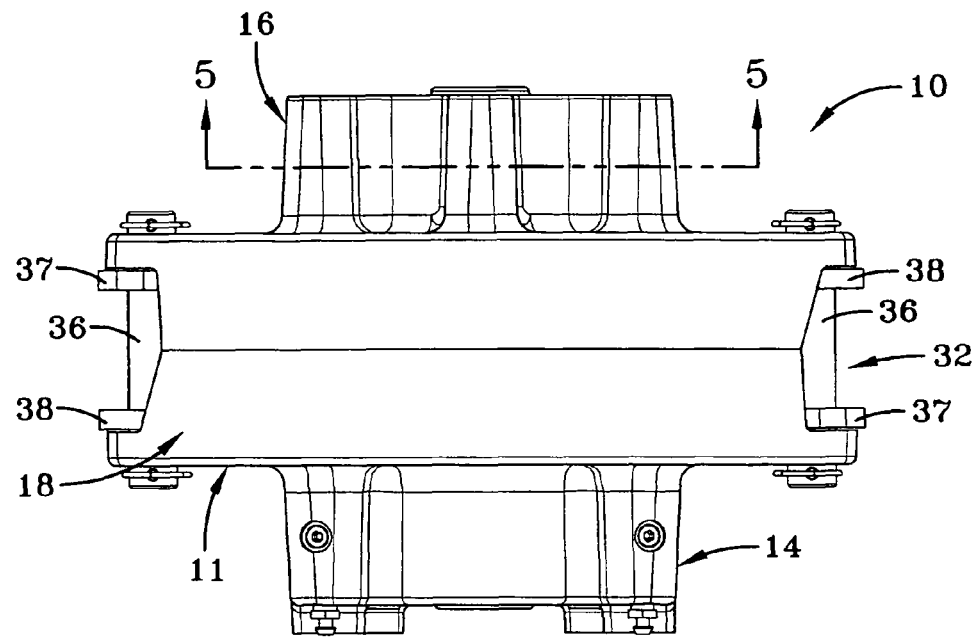
FIG. 1 is a top plan view of a first embodiment of the caliper brake according to the concepts of the present invention.
Figure 2:
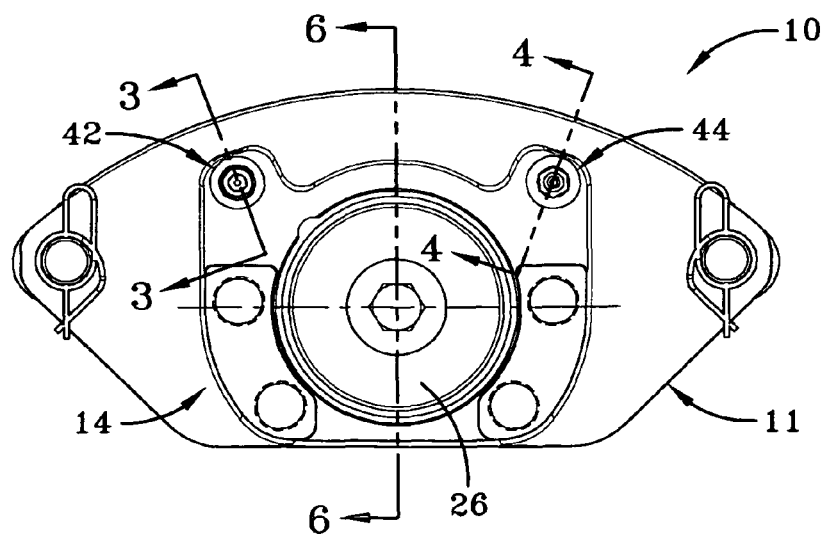
FIG. 2 is a side elevational view of the caliper brake of FIG. 1.

A caliper brake made in accordance with one embodiment of the present invention is shown in FIGS. 1-6 and is indicated generally by the numeral 10. The caliper brake 10 includes a housing 11 that carries and protects the operating components of brake 10. Caliper brake 10 is secured to a machine or vehicle frame by a plurality of bolts (not shown) that may be inserted through holes (not shown) in housing 11. Brake 10 includes a first half 14 and a second half 16, first half 14 being connected to second half 16 by a bridge 18, as is well known in the art of caliper brakes. First half 14 and second half 16 of housing 11 include bores 19 and 20 respectively. First half 14 includes a first piston 22 positioned within bore 19, and second half 16 includes a second piston 23 positioned within bore 20, each piston 22 and 23 having an engaging end 24 adjacent an inner opening of bores 19 and 20 respectively. An end cap 26 is positioned within each bore 19 and 20 adjacent an outer opening of the bore, and may engage a lip 25 within each bore 19 and 20. Each end cap 26 is secured in place by a retaining member 28 on the exterior of end cap 26. Retaining member 28 may be any mechanism known to those skilled in the art capable of securing end caps 26 within bores 19 and 20. One or more annular seals 29 may be provided around the periphery of each end cap 26 and pistons 22 and 23 to prevent fluid from leaking from caliper brake 10. The space within bore 19 between end cap 26 and piston 22 forms a first piston cavity 30. Similarly, the space within bore 20 between end cap 26 and piston 23 forms a second piston cavity 31.

A stator assembly 32 fits over a rotor of a vehicle (not shown) and is positioned between pistons 22 and 23. Stator assembly 32 includes a pair of stators 33, each having a stator plate 34 and a friction pad 35, and a pair of rods 36 (FIG. 1) located at opposing ends of bridge 18. Each stator plate 34 includes two ears 37 and 38 with holes therethrough (FIG. 1). Rods 36 are received in the holes in ears 37, 38 so that stators 33 are slidably mounted in place with one surface of each stator plate 34 in contact with engaging end 24 of pistons 22 and 23. The inner surface of friction pads 35 is adapted to engage a rotor of a vehicle when caliper brake 10 is actuated, as is well known in the art.

In operation, caliper brake 10 is mounted in a vehicle with the periphery of a rotor extending into stator assembly 32 between stators 33. A clearance is provided by caliper brake 10 between stators 33 so that the rotor may rotate freely when caliper brake 10 is not actuated. When a braking force is applied to a hydraulic input mechanism, such as, for example, a braking pedal, brake fluid is forced into first piston cavity 30 and second piston cavity 31. The brake fluid forced into the piston cavities 30, 31 causes pistons 22 and 23 to slide toward one another, thereby closing the gap between stators 33 and causing friction pads 35 to engage the vehicle rotor. Friction created between friction pads 35 and the rotor creates a braking force. When the hydraulic braking force is released, the fluid leaves the piston cavities 30 and 31, and the pistons 22 and 23 and stator assembly 32 returns to its rest position.

Figure 3:
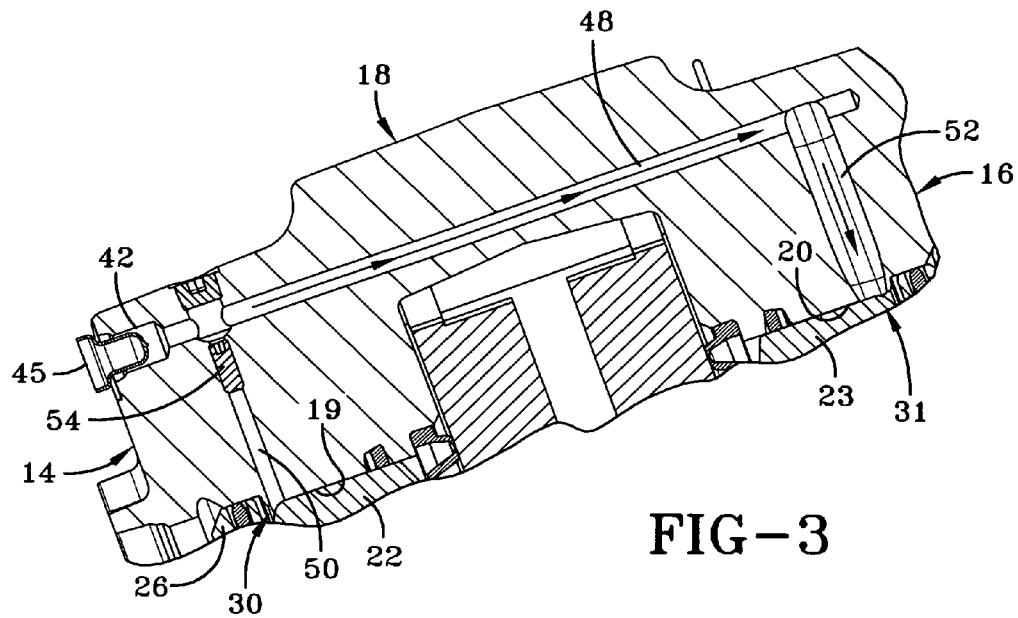
FIG. 3 is a sectional view taken substantially along line 3-3 of FIG. 2 showing the input port.
Figure 4:
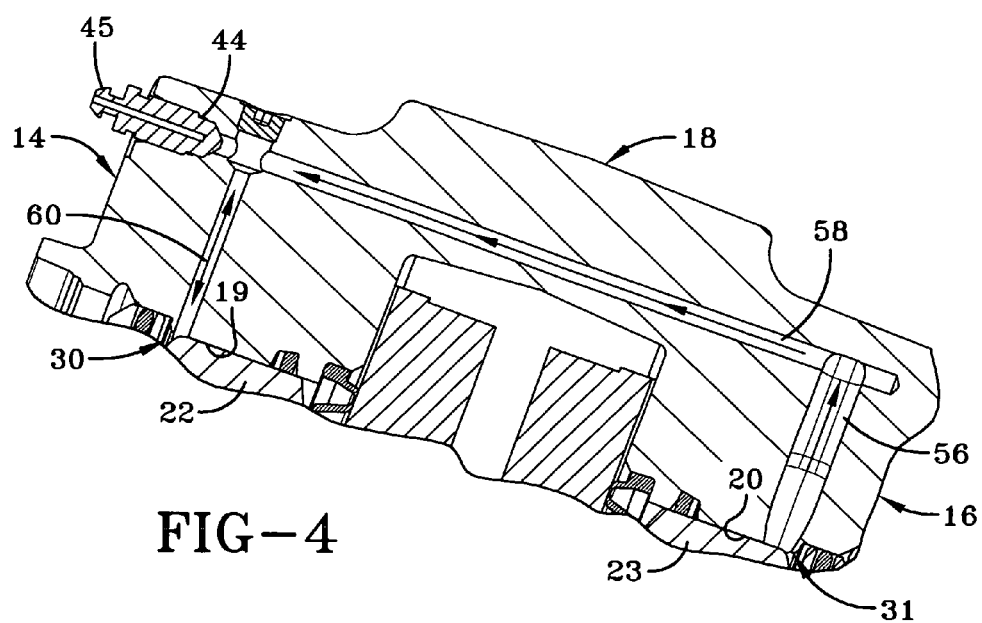
FIG. 4 is a sectional view taken substantially along line 4-4 of FIG. 2 showing the bleed port.

Caliper brake 10 also includes a fluid flow system, best shown in FIGS. 3 and 4. The fluid flow system provides a flow path for brake fluid and also allows for bleeding of the brake to remove air from within the fluid flow system. The fluid flow system includes an inlet port 42 and a bleed port 44, both of which are located in first half 14 of housing 11. It should be appreciated, however, that inlet port 42 and bleed port 44 may be located on either half of housing 11, as long as both are located in the same half. Both inlet port 42 and bleed port 44 have a plug 45 therein to prevent fluid leakage during normal operation of caliper brake 10.

FIG. 3 depicts the fluid flow path after entering inlet port 42. An inlet cross-channel 48 extends from inlet port 42 in first half 14 of housing 11, through bridge 18, and into second half 16 of housing 11. A first piston inlet passage 50 extends from inlet cross-channel 48 down into first piston cavity 30, and a second piston inlet passage 52 extends from inlet cross-channel 48 down into second piston cavity 31. A plug 54 is positioned within first inlet passage 50 to prevent the brake fluid from flowing into first piston cavity 30 immediately after entering through inlet port 42. Fluid flowing in through inlet port 42 is therefore forced past first piston inlet passage 50 and through cross-channel 48 to the second piston inlet passage 52.

Figure 5:
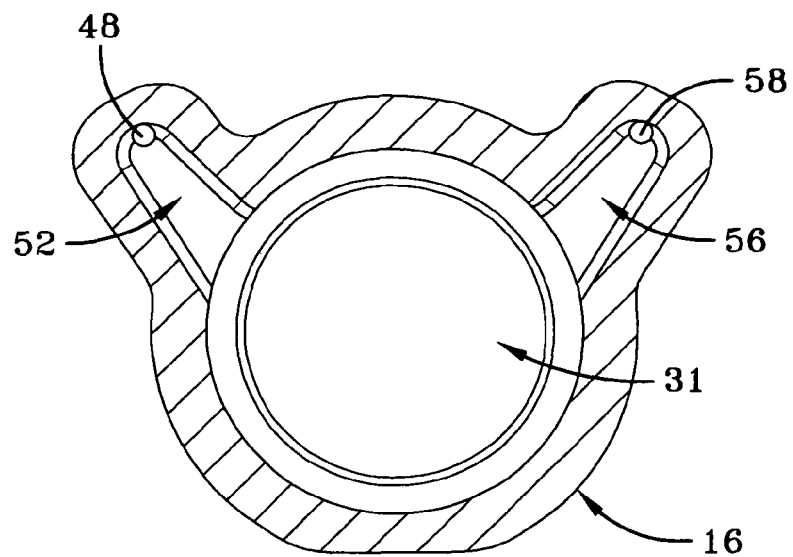
FIG. 5 is a sectional view taken substantially along line 5-5 of FIG. 1 showing the second piston cavity.
Figure 6:
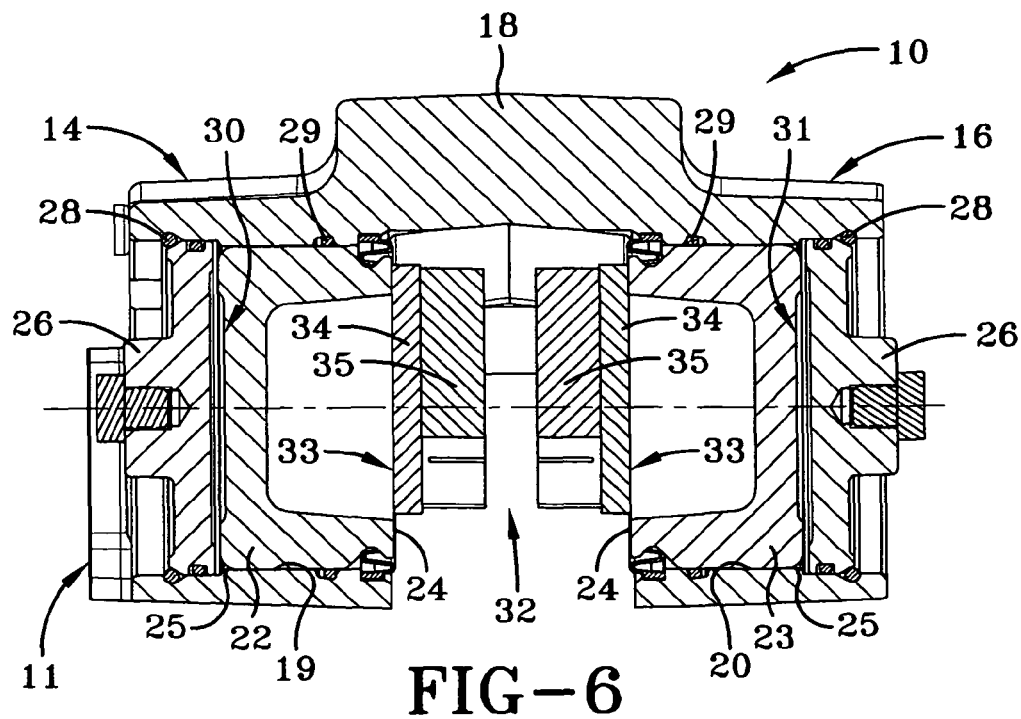
FIG. 6 is a sectional view taken substantially along line 6-6 of FIG. 2 showing the stator assemblies and pistons.
Figure 7:
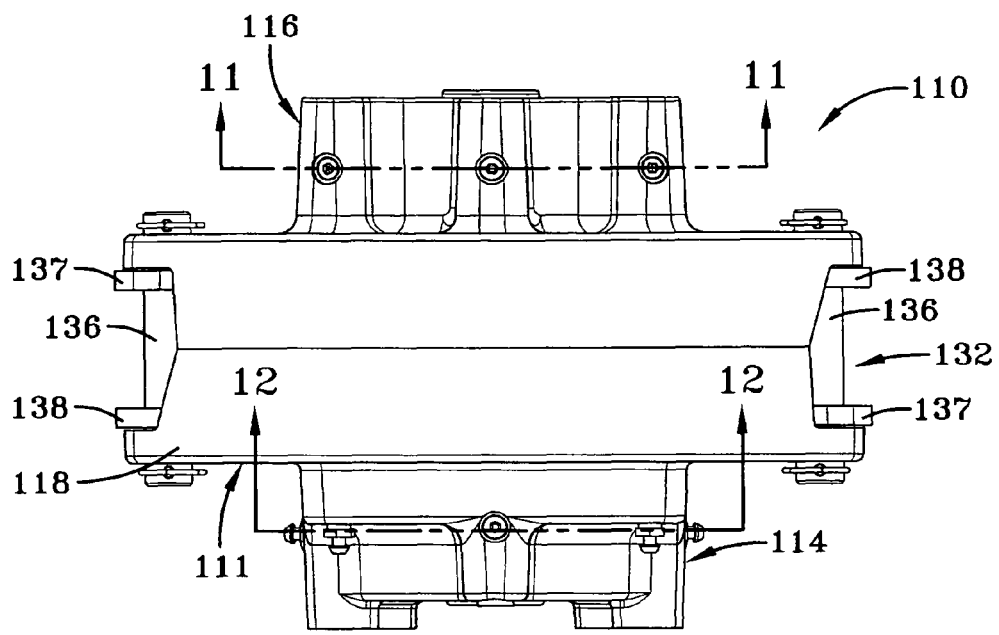
FIG. 7 is a top plan view of a second embodiment of the caliper brake according to the concepts of the present invention.

As best seen in FIG. 5, fluid flows into second piston cavity 31 from second piston inlet passage 52. When second piston cavity 31 fills, fluid flows out through second piston outlet passage 56 and into an outlet cross-channel 58. Outlet cross-channel 58 passes through second half 16 of housing 11, through bridge 18, and through first half 14 of housing 11 to bleed port 45. A first piston outlet passage 60 is in fluid communication with outlet cross-channel 58. Thus, after flowing out of second piston cavity 31 and through outlet cross-channel 58, fluid flows into first piston cavity 30 through first piston outlet passage 60. As fluid flows in through first piston outlet passage 60, air is forced out through the same passage and then is expelled through bleed port 45. In this way, positive bleeding is provided to both piston cavities without requiring access to both first half 14 and second half 16 of housing 11 after installation of the brake.

With reference now to FIGS. 7-13, a second embodiment of the caliper brake is shown and is referred to generally by the numeral 110. Brake 110 is similar in all respects to the brake 10 described above, except for variations in the fluid flow system. Therefore, like components in brake 110 will be referred to by like numerals. Caliper brake 110 includes a housing 111 having a first half 114 and a second half 116, first half 114 being connected to second half 116 by a bridge 118, as is well known in the art of caliper brakes. First half 114 and second half 116 of housing 111 include bores 119 and 120 respectively. First half 114 includes a first piston 122 positioned within bore 119, and second half 116 includes a second piston 123 positioned within bore 120, each piston 122 and 123 include an engaging end 124 adjacent an inner opening of bores 119 and 120. An end cap 126 is positioned within each bore 119 and 120 adjacent an outer opening of the bore, and may engage a lip 125 within bore 120. Each end cap 126 is secured in place by a retaining member 128 on the exterior of end cap 126. One or more annular seals 129 may be provided around the periphery of end caps 126 and pistons 122 and 123 to prevent fluid from leaking from caliper brake 110. The space within bores 119 and 120 between end caps 126 and pistons 122 and 123 form a first piston cavity 130 and a second piston cavity 131, respectively.

A stator assembly 132 fits over a rotor of a vehicle and is positioned between pistons 122 and 123. Stator assembly 132 includes a pair of stators 133, each having a stator plate 134 having a pair of ears 137, 138 with holes, and a friction pad 135. Stator assembly also includes a pair of rods 136 (FIG. 7) located at opposing ends of bridge 118. Caliper brake 110 operates in a manner substantially identical to that of caliper brake 10 described above.

Caliper brake 110 includes a fluid flow system as depicted in FIGS. 9-13. The fluid flow system includes an inlet port 142 (FIG. 13) in first half 114 of housing 111 that is in fluid communication with an inlet cross-channel 144 extending through first half 114, bridge 118, and into second half 116. Inlet cross-channel 144 is in fluid communication with a first piston inlet passage 146 and a second piston inlet passage 148, each of which is in fluid communication with its respective piston cavity 130, 131.

Figure 10:
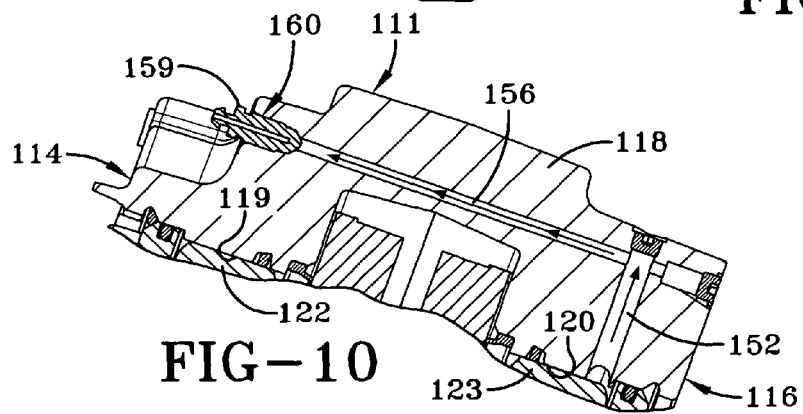
FIG. 10 is a sectional view taken substantially along line 10-10 of FIG. 8 showing an alternate second piston bleeder port.
Figure 11:
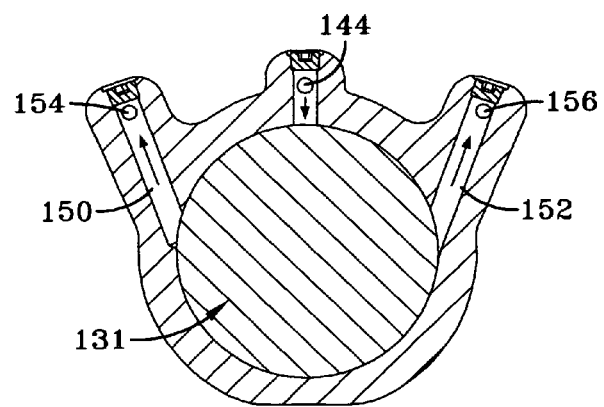
FIG. 11 is a sectional view taken substantially along line 11-11 of FIG. 7 showing the second piston cavity and cross-holes.

Second piston cavity 131 has two outlet passages, a primary second piston outlet passage 150, and an alternate second piston outlet passage 152 (FIG. 11). Each of these outlet passages 150, 152 intersects an outlet cross-channel, the primary passage 150 communicating with a primary outlet cross-channel 154 (FIG. 9), and the alternate passage communicating with an alternate outlet cross-channel 156 (FIG. 10). Primary outlet cross-channel 154 terminates at a primary second piston bleed port 158 having a plug 159 selectively secured therein, and alternate outlet cross-channel 156 terminates at an alternate second piston bleed port 160 having a plug 159 selectively secured therein. Both second piston bleed ports are located in the first half 114 of housing 111.

Figure 8:
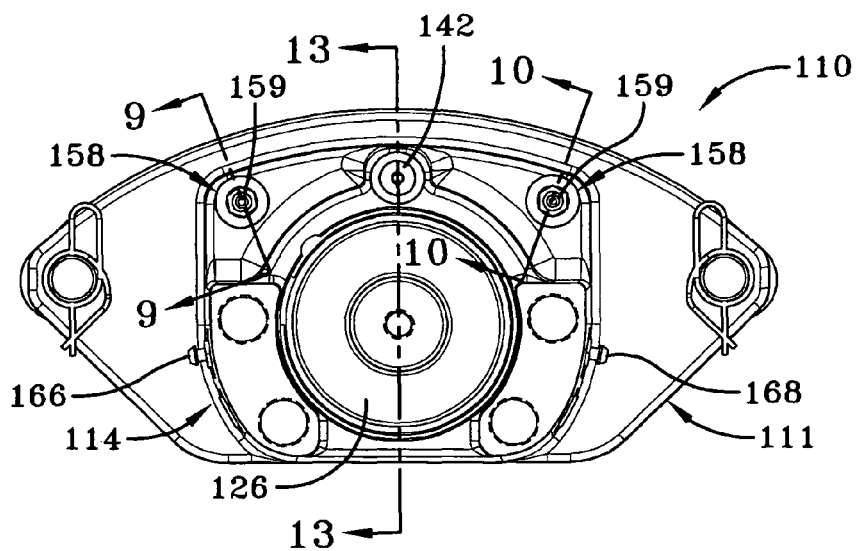
FIG. 8 is a side elevational view of the caliper brake of FIG. 7.
Figure 9:
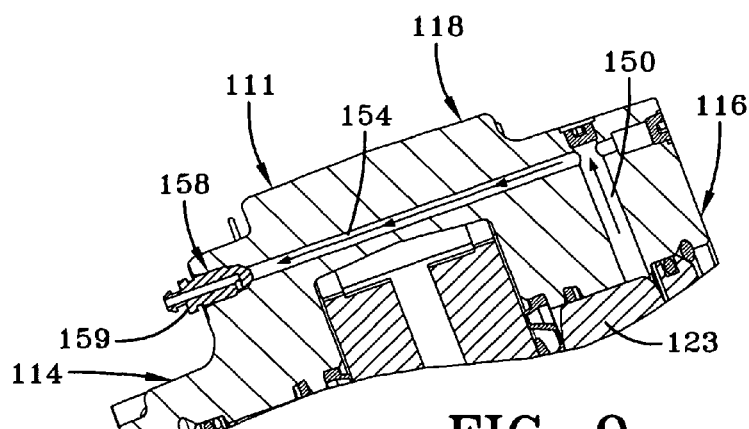
FIG. 9 is a sectional view taken substantially along line 9-9 of FIG. 8 showing the second piston bleeder port.
Figure 12:
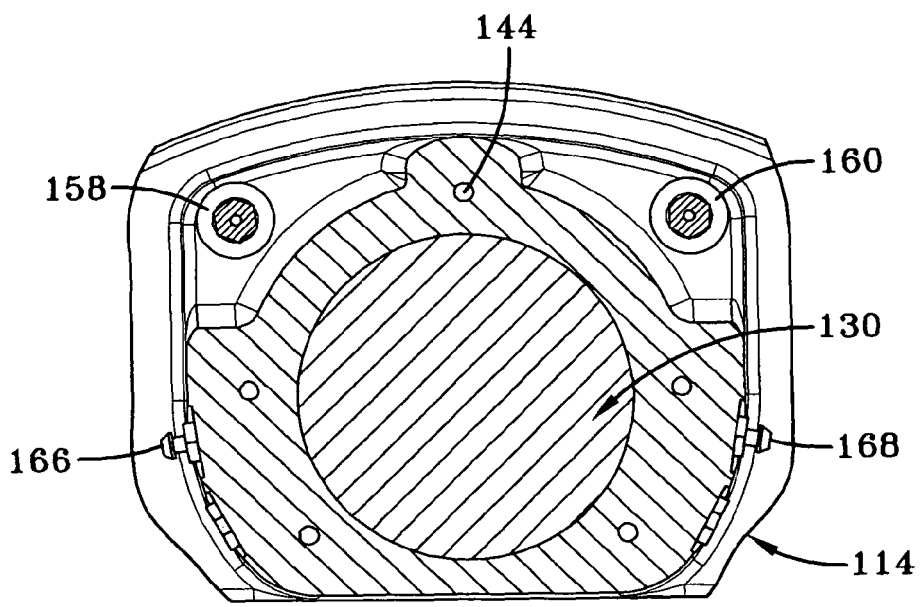
FIG. 12 is a sectional view taken substantially along line 12-12 of FIG. 7 showing the first piston cavity.
Figure 13:
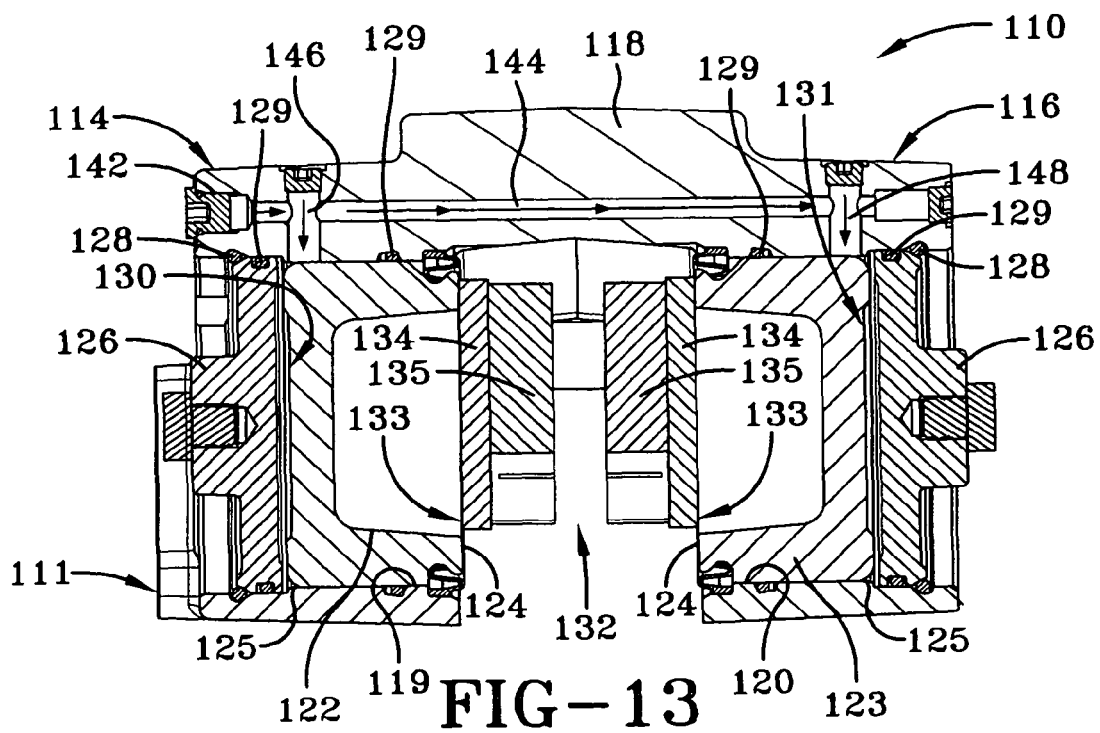
FIG. 13 is a sectional view taken substantially along line 13-13 of FIG. 8 the stator assemblies and pistons.

The fluid flow system also includes both a first piston primary bleed port 166 and a first piston alternative bleed port 168 for first piston cavity 130 (FIGS. 8 and 12). Both primary first piston bleed port 166 and alternative first piston bleed port 168 are located in the first half 114 of housing 111 and open directly into first piston cavity 130. Thus, with all input and bleed ports located in one half of housing 111, access to second half 116 is not necessary for bleeding the brake 110 after installation.

During bleeding of brake 110, fluid flows in through inlet port 142. If the first piston cavity 130 is to be bled, then one of the first piston bleeder ports 166, 168 must be opened. Fluid will then flow through first piston inlet passage 146, thereby forcing air out through a bleeder port 166, 168. If the second piston cavity 131 is to be bled, then one of the second piston bleeder ports 158, 160 must be opened. Fluid will then flow through inlet cross-channels 144 and second piston inlet passage 148, thereby forcing air out through a bleeder port 158, 160. Positive bleeding is thus provided to both pistons without requiring access to both sides of caliper brake 110, and the alternative bleed ports provide flexibility in mounting caliper brake 110 so that access to one specific area for bleeding purposes is not required.

It is thus evident that a caliper brake constructed as described herein accomplishes the objects of the present invention and otherwise substantially improves the art.

What is claimed is:

1. A hydraulic caliper brake comprising a housing having a first half and a second half; a first bore in said first half, a second bore in said second half, said first bore having a first fluid chamber therein, and said second bore having a second fluid chamber therein; a piston in each said bore; and a fluid network including an inlet port, a first bleed port and a second bleed port in said first half of said housing, said first bleed port being in fluid communication with said first fluid chamber, a first channel extending through said first half of said housing and into said second half of said housing and in fluid communication with said inlet port and said first and second fluid chambers, a second channel extending through said first half of said housing and into said second half of said housing and in fluid communication with said second fluid chamber and said second bleed port, wherein said first bleed port is used to bleed said first fluid chamber and said second bleed port is used to bleed said second fluid chamber.

2. The hydraulic caliper brake of claim 1, wherein said first channel is connected to said first fluid chamber by a first inlet passage, and to said second fluid chamber by a second inlet passage.

3. The hydraulic caliper brake of claim 1, wherein said second channel is connected to said second fluid chamber by a second outlet passageway.

4. The hydraulic caliper brake of claim 1, wherein a plug is selectively secured in each of said inlet port and said first and second bleed ports during normal operation of the brake to contain fluid within the fluid network.

5. The hydraulic caliper brake of claim 1, wherein said first half of said housing and said second half of said housing are separated by a gap, and wherein said pistons are positioned within said first and second bores adjacent said gap.

6. The hydraulic caliper brake of claim 5, wherein an end cap is positioned within each of said first and second bores opposite said gap.

7. The hydraulic caliper brake of claim 6, wherein said first and second fluid chambers are defined by said first and second bores, said end caps, and said pistons.

8. The hydraulic caliper brake of claim 7, further comprising a stator assembly including a pair of stators, each stator positioned adjacent one of said housing halves.

9. A hydraulic caliper brake comprising a housing having a first half and a second half; a bore in each of said housing halves, each said bore having a fluid chamber therein; a piston in each said bore; and a fluid network including an inlet port, a first bleed port, and a second bleed port in said first half of said housing, said first bleed port being in fluid communication with said first fluid chamber, a first channel extending through said first half of said housing and into said second half of said housing and in fluid communication with said inlet port and said fluid chambers in said first and second halves of said housing, a second channel extending through said first half of said housing and into said second half of said housing and in fluid communication with said fluid chamber in said second half of said housing and said second bleed port, and a third bleed port in said first half of said housing and in fluid communication with said fluid chamber in said first half of said housing, wherein said first bleed port is used to bleed said first fluid chamber, said second bleed port is used to bleed said second fluid chamber, and said third bleed port may be used an alternative bleed port for said first bleed port.

10. A hydraulic caliper brake comprising a housing having a first half and a second half; a bore in each of said housing halves, each said bore having a fluid chamber therein; a piston in each said bore; and a fluid network including an inlet port, a first bleed port, and a second bleed port in said first half of said housing, said first bleed port being in fluid communication with said first fluid chamber, a first channel extending through said first half of said housing and into said second half of said housing and in fluid communication with said inlet port and said fluid chambers in said first and second halves of said housing, a second channel extending through said first half of said housing and into said second half of said housing and in fluid communication with said fluid chamber in said second half of said housing and said second bleed port, and an alternate bleed port in said first half of said housing and a third channel extending through said first half of said housing and into said second half of said housing and in fluid communication with said fluid chamber in said second half of said housing and said alternate bleed port, wherein said first bleed port is used to bleed said first fluid chamber, said second bleed port is used to bleed said second fluid chamber, and said alternate bleed port may be used as an alternative bleed port for said second bleed port.

11. The hydraulic caliper brake of claim 10, wherein said third channel is connected to said fluid chamber in said second half of said housing by an alternate outlet passageway.

* * * * *